United States Patent [19]

Bashford et al.

[11] Patent Number: 4,679,080
[45] Date of Patent: Jul. 7, 1987

[54] FIELD BLANKING PULSE MODIFIER

[75] Inventors: Dennis J. Bashford; Geoffrey H. Blackham, both of Horsham, England

[73] Assignee: Rediffusion Simulation Limited, England

[21] Appl. No.: 773,249

[22] Filed: Sep. 6, 1985

[30] Foreign Application Priority Data

Sep. 6, 1984 [GB] United Kingdom ............ 8422548

[51] Int. Cl.⁴ .............................................. H04N 5/06
[52] U.S. Cl. .................................. 358/150; 358/148
[58] Field of Search ............ 358/148, 150, 151, 153, 358/154, 165

[56] References Cited

FOREIGN PATENT DOCUMENTS 2411327 9/1975 Fed. Rep. of Germany ...... 358/150

Primary Examiner—Tommy P. Chin
Assistant Examiner—David E. Harvey
Attorney, Agent, or Firm—Laurence Brown & Associates

[57] ABSTRACT

A field blanking pulse modifier in which the line synchronizing pulses and the field blanking pulse of a conventional television signal are derived. A counter is arranged to be reset by the field blanking pulse and to count the detected line synchronizing pulses or multiples thereof. An offset count is set corresponding to half the desired difference in duration between the modified field blanking pulse to be generated and the field blanking pulse of the television signal. The generation of the modified field blanking pulse is initiated when the sum of the counter content and the offset count is equal to the counter content which results after the counting of all the line synchronizing pulses between two successive field blanking pulses of the television signal, and the generation of the modified field blanking pulse is terminated when the counter content is equal to the offset count. With this arrangement the lines of the television picture which are blanked out are symmetrically positioned about the center of the scan and the required relationship between the fields of a frame can be accurately maintained to ensure correct interlacing.

2 Claims, 5 Drawing Figures

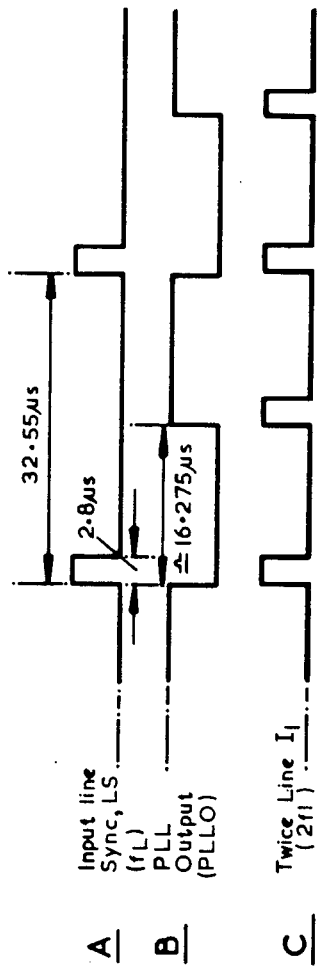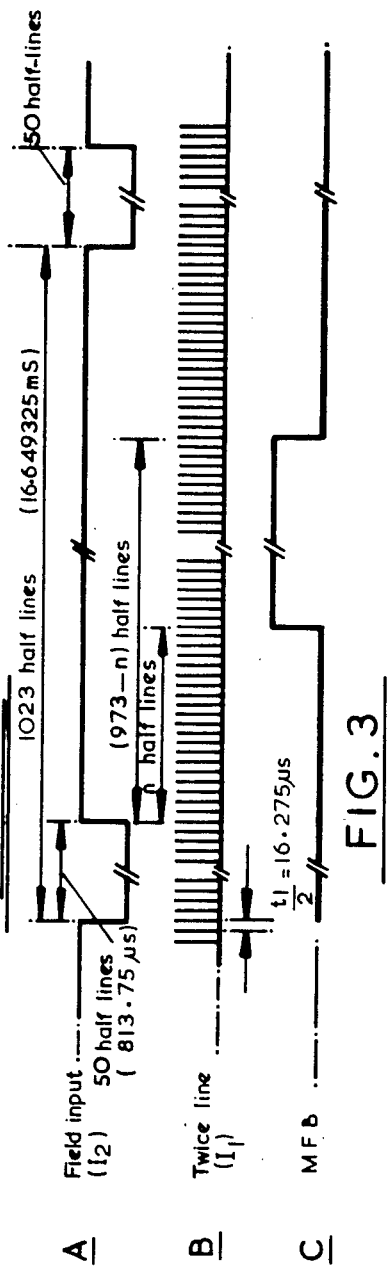

FIELD BLANKING PULSE MODIFIER

The present invention relates to a field blanking pulse modifier.

A conventional television signal provides picture information in the form of a series of frames having a predetermined number of horizontal lines, each frame being made up from two fields which each contain half the lines of the frame. The lines of one field are interlaced with the lines of the other. A field blanking pulse is inserted into the television signal between the end of one field and the beginning of the next field so that there is no visible effect when the deflection system used to appropriately position the lines of each field flies back vertically from the last line of one field to the first line of the next field.

Image generators have been built to produce television signals for use in flight simulators. The television signals produced are of conventional form and have a field blanking pulse the duration of which is typically less than 1 mS. This duration is sufficient when the signal is supplied to a conventional cathode ray tube (CRT) display having an electronic vertical deflection system of conventional type. Proposals have been advanced however for laser based television projectors using vertical deflection systems which are electromechanical and it is very difficult with such systems to achieve vertical fly back in the time allowed by a field blanking pulse of normal duration. In one electromechanical vertical deflection system which has been described a television signal is projected onto a viewing screen of a flight simulator via a mirror supported on the helmet of a trainee pilot operating the simulator. Line scanning is achieved by use of a continuously rotating polygonal mirror but vertical deflection is achieved by oscillating a mirror about an axis parallel to a line drawn through the trainee pilot's eyes. In one embodiment of this oscillating mirror system which has been built a vertical flyback time of 2.1 mS is required if the electro-mechanical system is to settle properly before commencing the next field.

It is possible to produce an image generator tailored to provide the field blanking pulse duration required by any particular deflection system but this is an expensive procedure. An alternative would be to simply extend the duration of the field blanking pulse in the output of a conventional image generator. This alternative would be relatively cheap given the availability of conventional image generators. Such a modification does not provide an acceptable solution however as the lines of the image lost during the extended portion of the field blanking pulse are at the top of the frames only so that the image viewed is not properly centred. In addition, the generation of a ramp voltage which must be provided to control the vertical deflection is dependent in conventional systems upon the field blanking pulse, and simply extending the field blanking pulse results in the fields not being correctly interlaced.

It is an object of the present invention to provide a field blanking pulse modifier, for providing in a television signal a field blanking pulse extended in time symmetrically about the input field blanking pulse.

According to the present invention, there is provided a field blanking pulse modifier comprising means for deriving the line synchronising pulses of a conventional television signal, means for deriving the field blanking pulse of the television signal, a counter which is reset by the field blanking pulse and counts line synchronising pulses or signals related thereto, means for setting an offset count corresponding to half the desired difference in duration between the modified field blanking pulse to be generated and the field blanking pulse of the television signal, means for initiating generation of the modified field blanking pulse when the sum of the counter content and the offset count is equal to the counter content which results after the counting of all the line synchronising pulses between two successive field blanking pulses of the television signal, and means for terminating generation of the modified field blanking pulse when the counter content is equal to the offset count.

With the above arrangement the lines of the television picture which are blanked out are symmetrically positioned about the centre of the scan and the required relationship between the fields of a frame can be accurately maintained to ensure correct interlacing. Generally the television signal is such that on alternate fields the start of the active field is at a mid-line instant, and if this is the case it is necessary to extend the start and end of each field blanking pulse by an integral multiple of half line durations. Accordingly in such circumstances the counter is arranged to count pulses at twice the line synchronisation pulse frequency.

Preferably, the means for initiating and terminating the generation of the modified field blanking pulse comprise a control logic circuit receiving the output of a comparator, the comparator receiving the outputs of the offset count setting means and a gate, and a subtractor receiving the output of the counter and a predetermined count corresponding to the counter content which results after the counting of all the line synchronising pulses between two successive field blanking pulses of the television signal, wherein the gate receives the output of the counter and the output of the subtractor and is controlled by the control logic circuit to alternately switch through each of the two inputs supplied to it, the comparator output enabling the control logic circuit to generate the modified field blanking pulse when the gate output is less than the output of the offset count setting means.

An embodiment of the present invention will now be described, by way of example, with reference to the accompanying drawings, in which:

FIGS. 2 and 3 illustrate waveforms appearing in the embodiment of FIG. 1; and

Figure 1:
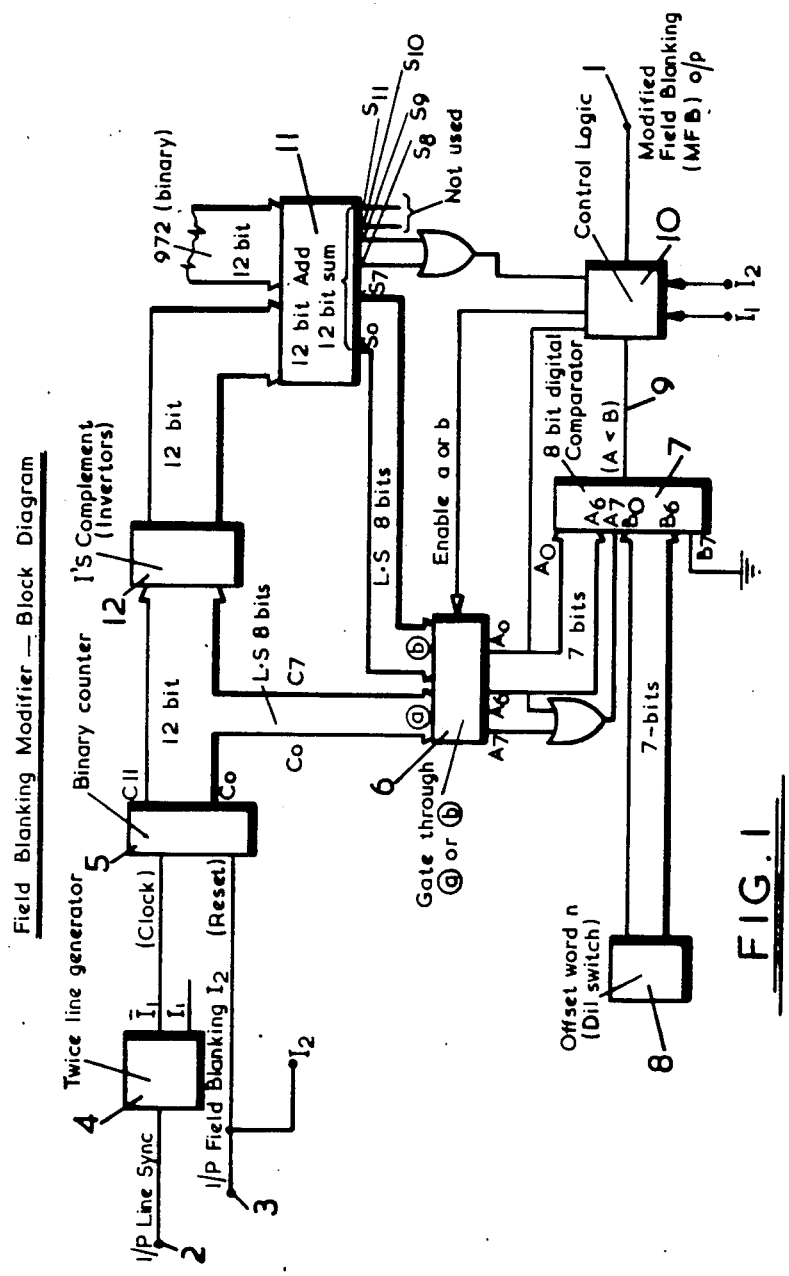
FIG. 1 is a schematic diagram of an embodiment of the present invention for use with helmet-mounted projection systems.

Referring to FIG. 1 the illustrated arrangement is provided to generate a modified field blanking pulse at output 1 from the line synchronising signal and field blanking signal of a conventional television signal. The line synchronising signal is applied to input 2 and the field blanking signal to input 3. The television signal has 1023 lines with 25 line duration field blanking pulses.

The field blanking pulse signal supplied to input 3 by an image generator has a duration of 813.75 $\mu$S. This duration is sufficient for vertical flyback of normal C.R.T. deflection systems but not for flyback of the galvano-meters used for vertical deflection in helmet-mounted projection systems, of the type referred to above. For adequate settling, a flyback time of nominally 2.1 mS is required in such helmet-mounted systems.

The modified field blanking pulse must have a duration at least as long as the nominal flyback time and also must be such that the half line relationship between successive field blanking pulses is maintained, and must be extended in time symmetrically about the input field blanking pulses.

The modified field blanking pulse is used to both blank off the video signal outputs from video processors during vertical flyback and also to reset an integrator in the field ramp generator. This last application of the modified pulse gives rise to the above requirement that the half line relationship be maintained as it provides the synchronising reference for field ramp generation and must therefore retain the necessary half-line inter-field relationship to ensure correct interlace. The extension in time of the field blanking pulse must be symmetrical in order to blank off equal areas of video information from the upper and lower extremes of the images, thus centralising the projected image.

The line sync input is applied to a twice line frequency pulse generator 4 that generates a pulse train of twice line frequency with equal pulse durations. Half line pulses are necessary because there is a 511.5 line diffrence between field pulses in each frame. This means that on alternate fields the start of the active field is at a mid-line instant. Hence, in order to extend each field pulse by the same number of half-lines, intermediate half line pulses must be made available.

The input field pulse applied to input 3 resets a binary counter 5 which subsequently counts the half-line pulses. At the beginning of each field the control logic which is described in more detail below is configured such that the eight least significant bits of the counter output are directly gated through a gate circuit to the "A" inputs of an 8-bit digital comparator 7. When the counter output reaches the count set on a binary offset switch pack 8, the (A<B) output 9 of the comparator 7 changes from a logic high to a logic low state. This is latched through to the output 1 and a control logic circuit 10 gates the 8-bit word appearing at the "b" input to the gate 6 through to the comparator 7. Thus the comparator 7 receives the eight least significant bits of the output of an adder 11.

The adder 11 is configured with invertors 12 to produce a subtractor, giving an output which decrements for each half-line pulse occurrence. The subtractor subtracts the output of counter 5 from a fixed number (minuend) determined by the number of half lines per field (n1) and the number of half lines per input field blanking pulse (n2). The relationship is:

minuend = $n1 - n2$

In the present 1023 line system with 25 line field blanking pulses, there are 1023 half-lines per field and 50 half-lines per field blanking pulse, hence minuend = $1023 - 50 = 973$ The subtractor output difference is therefore:

difference = minuend − counter output = 973 − count.

When this difference goes below the offset set on the DIL switch pack 8, the comparator (A<B) output 9 returns back to a logic high state which latches through to the output 1. By using the relationship described, an active high modified field blanking pulse is generated which is extended in time symmetrically about the input field blanking pulse with the extension being adjustable in half-line increments by the single DIL switch pack. Thus the desired relationship between the input field blanking pulse on input 3 and the modified field blanking pulse on output 1 is achieved.

Figure 4:
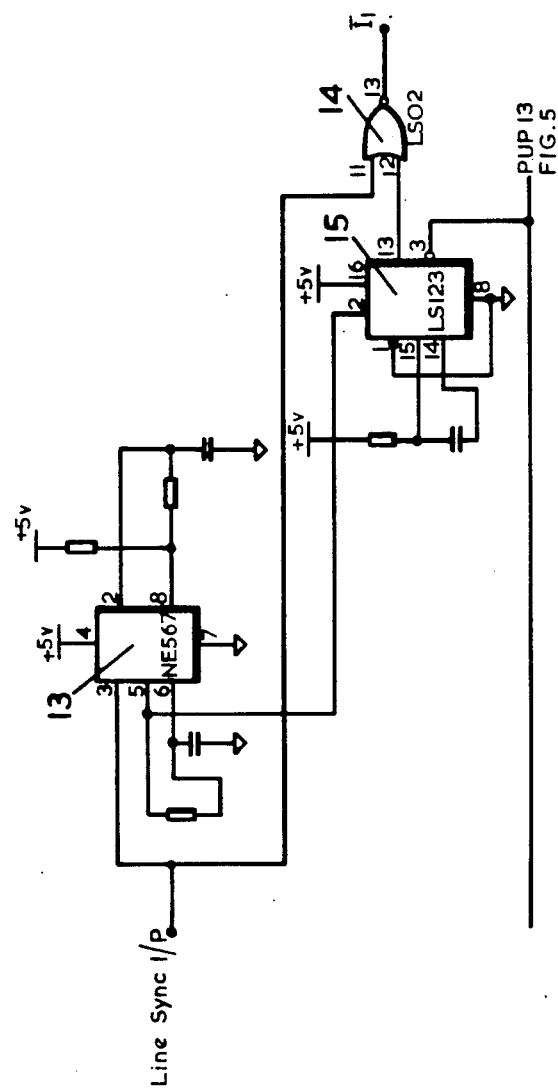
FIGS. 4 and 5 are block diagrams illustrating the circuitry of the embodiment of FIG. 1.

Referring now to FIG. 2 in conjunction with FIG. 4, the outline of a circuit corresponding to the twice line frequency generator 4 of FIG. 1 will be described.

The line synchronising signal LS (active high) is shown in FIG. 2A and is applied to the input of a NE 567 phase locked loop 13 and to a gate 14. The phase locked loop (PLL) 13 is configured to give a square wave output (FIG. 2B) of the same period and with its negative going edge coincident with the positive going edge of the line sync signal. The positive going edge of the PLL output is then used to trigger a monostable 15 to give a pulse of equal width to that of the line sync pulse, offset by a half line period. This intermediate pulse is combined with the signal LS by gate 14 to give a twice line frequency pulse train $\bar{I}_1$. FIG. 2C shows the signal $I_1$.

Figure 5:
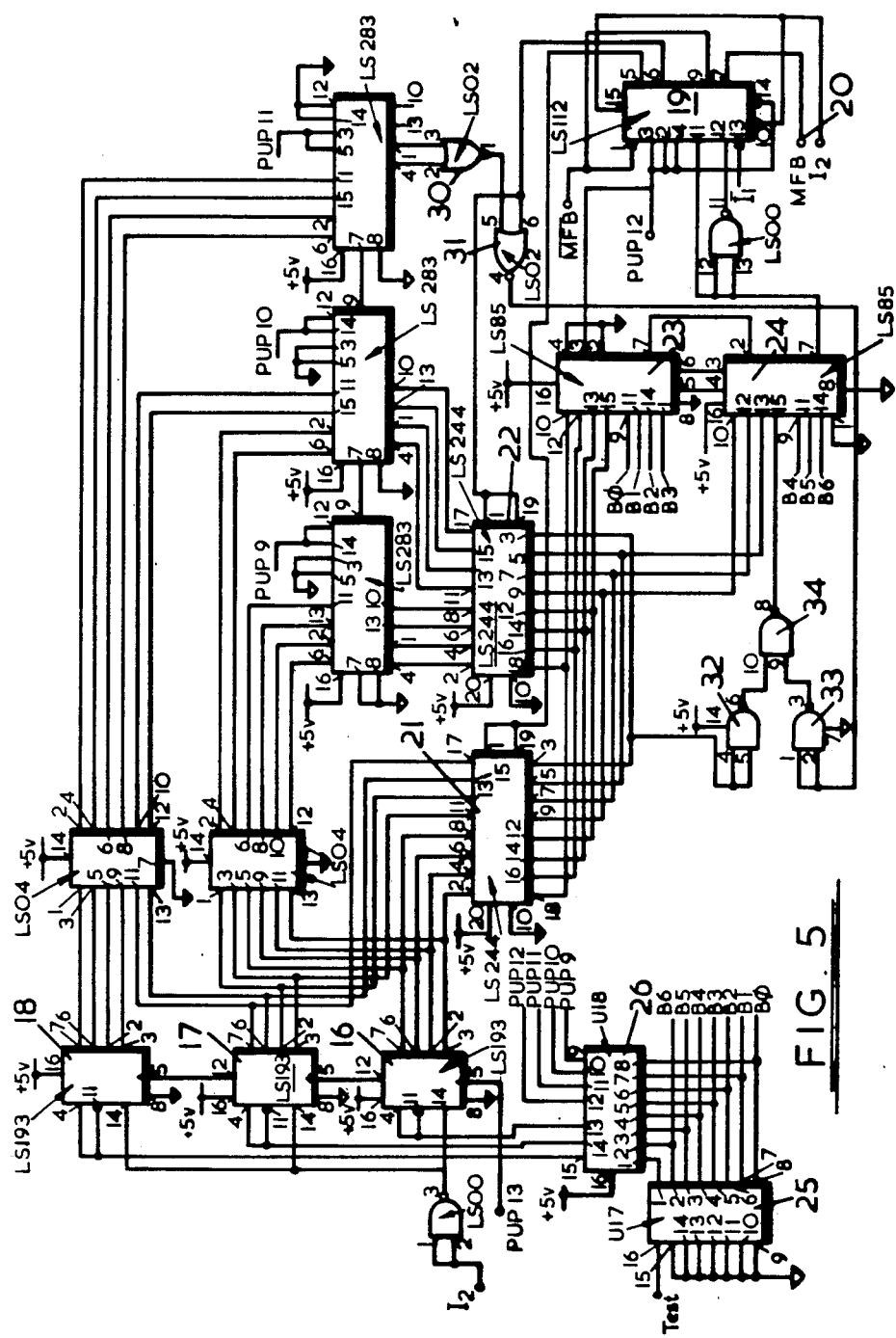

Referring now to FIGS. 3 and 5, the outline of a circuit corresponding to the remaining components of FIG. 1 will be described.

The field blanking signal $I_2$ (active low) shown in FIG. 3A and the twice line signal $I_1$ (FIG. 3B) are applied to a binary counter chain corresponding to the counters 5 of FIG. 1 and made up of three elements 16, 17 and 18 forming a 12-bit counter. The field blanking pulse $I_2$ is also used to reset a JK flip-flop connected as a D-type bistable 19 and a JK flip-flop connected as a T-type bistable, also part of component 19 which corresponds to the logic circuit 10 of FIG. 1.

This sets up the initial condition at the beginning of each field, setting a logic low output at output 20 which corresponds to the inverse of the output 1 of FIG. 1 and is shown in FIG. 3C. Octal buffer 21 (corresponding with buffer 22 to the gate 6 of FIG. 1) is enabled and, as the counter chain 16, 17, 18 counts half-line pulses up from zero, the least significant eight bits of the counter output appear at the inputs to an 8-bit comparator (comprising two 4-bit comparators 23, 24 corresponding to comparator 7 of FIG. 1). When this count reaches that set on a DIL switch/pull-up pack 25, 26 (see switch 8 of FIG. 1) the (A<B) comparator output changes from a logic high to a logic low level. The value set on the DIL switch can range from $00000000_2$ to $11111111_2$ (or 0 to $127_{10}$).

After being latched through the D-type flip flop to set output 20 high this transition triggers the T-type latch.

As buffer 21 is disabled and buffer 22 is enabled, the "A" inputs to the comparators are then the least significant eight bits of the output of an adder comprising components 27, 28 and 29 (see adder 11 of FIG. 1), which counts down. The most significant "A" input to the comparators is held high via gates 30, 31, 32, 33 and 34 while the adder output is greater than $11111111_2$. This prevents incorrect switching of the (A<B) comparator output as the adder output counts down.

When the adder output falls to less than the set offset, the (A<B) comparator output returns high. This in turn latches through to give a low MFB output. The low to high transition does not affect the T-type bistable. The D-type latch is used to eliminate glitching due to adder output errors during carry ripple through.

The MFB output is thus an active low modified field blanking pulse.

What is claimed is:

1. A field blanking pulse modifier comprising means for deriving clock pulses from line synchronizing pulses of a conventional television signal, means for deriving a field blanking pulse from the television signal, a counter providing an output count which is reset by the derived field blanking pulse and counts the clock pulses, means for setting an offset count corresponding to half a predetermined difference between the duration of a modified field blanking pulse to be generated and the duration of the derived field blanking pulse, means for initiating the modified field blanking pulse before the derived field blanking pulse when a difference between the counter output count and a predetermined count which is equal to the number of the clock pulses which occur between two successive derived field blanking pulses becomes less than the offset count, and for terminating the modified field blanking pulse after the derived field blanking pulse when the counter output count becomes equal to the offset count, wherein the means for initiating and terminating the modified field blanking pulse comprises a control logic circuit, a comparator for comparing the offset count and the output from a gate to produce a comparator output, and a subtractor receiving the counter output count and the predetermined count, wherein the gate receives the counter output count and the output of the subtractor and is controlled by the control logic circuit to alternately provide as the gate output the two outputs supplied to it, said control logic circuit being responsive to the comparator output to generate the modified field blanking pulse during a period when the gate output is less than the offset count.

2. A field blanking pulse modifier according to claim 1, wherein the frequency of the clock pulses is twice the frequency of the line synchronization pulses.

* * * * *